(12) United States Patent
Oliva et al.

(10) Patent No.: US 8,113,430 B2
(45) Date of Patent: Feb. 14, 2012

(54) ILLUMINATION LENS FOR OPTICAL CODE READER

(75) Inventors: Guido Maurizio Oliva, Rovigo (IT);
Donato Vincenzi, Cento (IT)

(73) Assignee: Datalogic Scanning Group S.r.L.,
Lippo di Calderara di Reno (BO) (IT)

( * ) Notice: Subject to any disclaimer, the term of this patent is extended or adjusted under 35 U.S.C. 154(b) by 591 days.

(21) Appl. No.: 12/158,776

(22) PCT Filed: Dec. 20, 2006

(86) PCT No.: PCT/EP2006/012295
§ 371 (c)(1),
(2), (4) Date: Sep. 8, 2008

(87) PCT Pub. No.: WO2007/076932
PCT Pub. Date: Jul. 12, 2007

(65) Prior Publication Data
US 2009/0032595 A1    Feb. 5, 2009

(30) Foreign Application Priority Data
Dec. 30, 2005 (EP) .................................. 05425949

(51) Int. Cl.
*G02B 5/08* (2006.01)
*G02B 26/00* (2006.01)
*G06K 7/10* (2006.01)

(52) U.S. Cl. .............................. 235/462.35; 235/462.33
(58) Field of Classification Search ............. 235/462.35, 235/462.43, 462.33, 462.32, 462.37
See application file for complete search history.

(56) References Cited

U.S. PATENT DOCUMENTS

| | | | |
|---|---|---|---|
| 5,504,316 A | 4/1996 | Bridgelall et al. |
| 5,504,317 A | 4/1996 | Takahaski |
| 5,786,585 A | 7/1998 | Eastman et al. |
| 7,083,097 B2 | 8/2006 | Toyama et al. |
| 2005/0035203 A1 | 2/2005 | Runge |
| 2005/0141087 A1 | 6/2005 | Yoshida |

FOREIGN PATENT DOCUMENTS

| | | |
|---|---|---|
| GB | 2225659 A | 6/1990 |
| JP | 2005018306 A | 1/2005 |

OTHER PUBLICATIONS

International Search Report and Written Opinion for PCT/EP2006/012295 dated Jul. 30, 2007.
International Preliminary Report on Patentability issued Jul. 1, 2008, for corresponding International Application No. PCT/EP2006/012295.
European Search Report dated Mar. 16, 2011 and transmittal Communication dated Apr. 1, 2011, in corresponding EP Divisional Application No. 10012055.9-1234.
European Search Report dated Mar. 16, 2011 and transmittal Communication dated Apr. 24, 2011, in corresponding EP Divisional Application No. 10011947.8-1234.

*Primary Examiner* — Edwyn Labaze
(74) *Attorney, Agent, or Firm* — Duane Morris LLP

(57) ABSTRACT

An optical code reader of the imager type includes at least one light source and at least one illumination lens downstream of the at least one light source for projecting a predetermined illumination pattern. The at least one illumination lens comprises a first main face, wherein in a first direction, the first main face has a plurality of elementary regions, each of the elementary regions of the at least one illumination lens having a slope with respect to an optical axis of the reader that is individually calculated so that the elementary region deviates the light fraction coming from the at least one light source and incident thereon towards a specific elementary region of the illumination pattern.

31 Claims, 7 Drawing Sheets

ILLUMINATION LENS FOR OPTICAL CODE READER

FIELD OF THE INVENTION

The present invention relates to an optical code reader, an illumination lens for such a reader, and a method of manufacture thereof.

BACKGROUND OF THE INVENTION

As known, an optical code is information coded in the colour and optionally in the number and in the relative size of a plurality of elements. Linear optical codes of the bar type, for example, contain an alternating sequence of typically black bars and typically white spaces, each having a width multiple of an elementary width. Two-dimensional codes contain a grid of elements of constant shape and size, but with two or more different colours. In any case, also alphanumerical characters in general fall within the term "optical code" as used in the present description and in the annexed claims.

Generally, optical code readers comprise one or more light sources and an illumination optics for illuminating an illumination pattern on an optical code, and means for detecting the light diffused by the illuminated optical code and for generating an electrical signal whose amplitude and whose phase are representative of the colour and of the size of the optical code elements.

The electrical signal is suitably processed, for example through filters, amplifiers and digitisers, for obtaining a binary representation of the optical code, which is then decoded for obtaining the information associated with the specific optical code being read. A part of the reading of the optical code, typically the decoding, can be delegated to a host processor.

More specifically, the invention relates to optical code readers of the imager type, wherein the entire code, or the entire width of a linear code, is simultaneously illuminated, and the light diffused by the entire illuminated optical code is collected and detected through a photodetector device or sensor of linear or matrix type, respectively in the case of linear and two-dimensional optical codes.

For a good reading result, the illumination pattern in imager readers should have a well defined shape. In imager readers, moreover, the electrical signal should not be influenced by non-uniformity in the illumination of the various regions of the optical code caused for example by the emission characteristics of the illumination source(s) used, nor by non-uniformity of response among the various sensitive regions of the sensor, caused for example by the different angle at which they are illuminated by the light diffused by the optical code.

It is therefore known to associate an illumination optics with the light source(s), optics which should correct such non-uniformities.

Among the known solutions for linear optical codes, besides negative or positive lenses, lenticular arrays, holographic diffusers and prismatic arrays, the latter described for example in U.S. Pat. No. 5,504,317, may be mentioned. All these solutions provide for local repetitions of microstructures, which allow to diffuse the incident light beam only in a desired direction, at a predetermined angle. The emission lobes of two light sources can thus be overlapped, increasing the uniformity of the illumination line and improving the appearance of the scan line.

In the above described known solutions, an illumination pattern of uniform intensity is provided to the expenses of a reduced overall efficiency of the reader since an area much larger than the area actually framed by the reader receiving optics is typically illuminated, as it can be seen in FIG. 15. Such a figure diagrammatically shows the irradiance profile generated on the optimum focus plane and at close reading range by two LED (Light Emitting Diode) light sources $100a$, $100b$ having associated respective conventional optics $101a$, $101b$, and the relation thereof with the field of view 102 of the receiving optics. From the figure, moreover, it may be noted that at close reading range, the reader efficiency is even lower and the reading line is poorly uniform. At all reading distances, moreover, the side edges of the illumination line are poorly defined, so the reader operator does not have a clear indication of the angular extension of the reading area.

GB 2 225 659 A teaches to associate each of a pair of LEDs (Light Emitting Diodes) with a lens or lens portion for focusing the light in a direction parallel to an optical code arranged in a predetermined position with respect to the reader, and a lens or lens portion for focusing the light in a direction orthogonal to the optical code, in order to obtain a thin strip-like illumination line, wherein the illumination at the ends of the strip can be stronger than at the centre. Each lens or lens portion for focusing in the direction parallel to the code exhibits two regions with different radius of curvature. In another embodiment, such a document provides for a single LED and a lens or lens portion which is concave in a central portion and convex in the two side regions, with a radius of curvature that gradually decreases towards the lens ends. Also in this case, an area much larger than the area actually framed by the reader receiving optics is illuminated.

SUMMARY OF THE INVENTION

An optical code reader of the imager type includes at least one light source and at least one illumination lens downstream of the at least one light source for projecting a predetermined illumination pattern. The at least one illumination lens comprises a first main face, wherein in a first direction, the first main face has a plurality of elementary regions, each of the elementary regions of the at least one illumination lens having a slope with respect to an optical axis of the reader that is individually calculated so that the elementary region deviates the light fraction coming from the at least one light source and incident thereon towards a specific elementary region of the illumination pattern.

An illumination lens for an optical code reader for projecting a predetermined illumination pattern and a method of manufacturing the same are also provided.

These and other features and advantages of the reader according to the invention will appear more clearly from the following detailed description of some embodiments thereof, made with reference to the annexed drawings provided merely by way of a non-limiting example. The drawings are diagrammatic representations, wherein the hatching filling the different components is used simply for better differentiating them from each other, and is neither indicative of section planes nor of constituent materials. Moreover, some components are shown as if they were transparent, again, only in order to better show the components behind.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
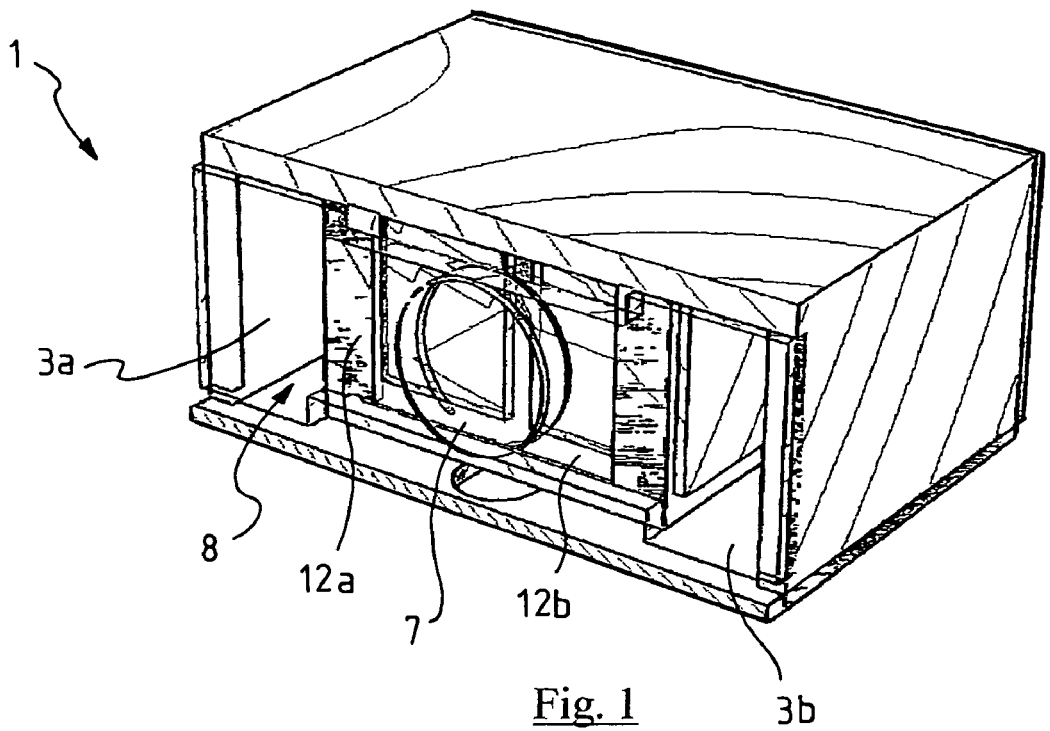
FIG. 1 shows a perspective view of a reader according to the invention.

In the present description and in the annexed claims, term "light" is used in a broad sense to mean not only electromagnetic radiation in the visible spectrum, but also electromagnetic radiation of such wavelengths as to be manipulated with the optical techniques usable for the visible spectrum, thus including the UV and IR regions also.

The technical problem at the basis of the invention is to allow an effective illumination of the optical code in an optical code reader of the imager type.

According to the invention, such a problem is solved by an optical code reader of the imager type, comprising at least one light source and at least one illumination lens downstream of said at least one light source for projecting a predetermined illumination pattern, said at least one illumination lens comprising a first main face, characterized in that in a first direction, said first main face has a plurality of elementary regions, each of said elementary regions of said at least one illumination lens having a slope with respect to an optical axis of the reader that is individually calculated so that said elementary region deviates the light fraction coming from said at least one light source and incident thereon towards a specific elementary region of the illumination pattern.

It is therefore possible to associate one or more elementary lens regions with each elementary region of the illumination pattern, so as to obtain the desired light intensity in every elementary region of the illumination pattern, thus creating an irradiance profile which corrects the above mentioned non-uniformity in an optimum manner.

If the illumination lens(es) is/are essentially perpendicular to an optical axis of the reader, defined by the receiving optics thereof, namely essentially facing the optical code, the first direction is typically parallel to the code direction; if conversely the illumination lens(es) is/are arranged at an angle with respect to the optical axis of the reader, the first direction is not parallel to the direction of the optical code.

In some embodiments, adjacent elementary regions of the illumination lens(es) have slopes that are individually calculated for illuminating a same elementary region of the illumination pattern or adjacent elementary regions of the illumination pattern.

In this way, if the required irradiance profile in the illumination pattern is essentially uniform, adjacent elementary regions of the illumination lens(es) have slopes in the same direction and with a small slope difference.

More in particular, in one embodiment the elementary regions of the illumination lens(es) are curved regions, the radius of curvature slowly changing between adjacent elementary regions.

In another embodiment, the elementary regions of the illumination lens(es) are flat regions, close edges of adjacent elementary regions of the illumination lens(es) being coincident.

Such continuous profiles of the lens(es) are easily made with low-cost techniques, such as injection moulding.

In the above embodiments, preferably the density of elementary regions is more than 50 elementary regions per millimeter, more preferably more than 100 elementary regions per millimeter.

In another embodiment, the elementary regions of the illumination lens(es) are flat regions, close edges of adjacent elementary regions of the illumination lens(es) being not coincident, with connecting faces arranged thereinbetween.

In this way, the lens(es) has/have a macroscopically essentially constant thickness for the entire width thereof in the first direction.

In another embodiment, the specific elementary regions of the illumination pattern are selected so that adjacent elementary regions of the illumination lens(es) have slopes in opposite directions.

Also in this way, the lens(es) has/have a macroscopically essentially constant thickness for the entire width thereof in the first direction and is/are made with low-cost techniques such as injection moulding.

In the above embodiments, preferably the density of elementary regions is more than 2 elementary regions per millimeter, more preferably more than 5 elementary regions millimeter and even more preferably, more than 10 elementary regions per millimeter.

Typically, the slopes are calculated so that the elementary regions of the illumination pattern are equally illuminated.

Alternatively, the slopes are calculated so that end elementary regions of the illumination pattern are more illuminated than intermediate elementary regions of the illumination pattern.

Moreover, the slopes may be calculated so as to generate an aiming light pattern, preferably in end regions of the illumination pattern and/or so as to generate a light pattern for signalling the result of the reading.

Preferably, the slopes are calculated so as to minimize the influence of the reader to illumination pattern distance on the irradiance profile of said illumination pattern.

Typically, the reader further comprises a photodetector device arranged for receiving said light diffused by a support illuminated by said illumination pattern, and advantageously said slopes are calculated so that said illumination pattern has such an irradiance profile that said light received by said photodetector device through the receiving optics has a uniform distribution when said support has uniform diffusing properties.

In this way, the electrical signal generated by the photodetector device exhibits an intensity that is uniquely modulated by the reflectivity of the optical code elements.

In the case of a linear reader, to concentrate the illumination light in the direction orthogonal to the optical code forming a thin illumination line, in first particularly simple embodiments, a second main face of said illumination lens (es), opposite to the first main face, is a cylindrical surface.

In other embodiments, in a second direction orthogonal to said first direction, a second main face of said lens, opposite to the first main face, exhibits a plurality of second elementary regions, each of said second elementary regions having a slope with respect to said optical axis that is individually calculated so that all the second elementary regions deviate the light fraction coming from said at least one light source and incident thereon towards a same elementary region of an illumination pattern.

In this way it is possible to obtain a strip-like illumination pattern wherein also the longitudinal edges of the strip are more defined and more marked, as compared to that generated by a conventional cylindrical lens, since the spherical aberration contribution that is instead present with a conventional lens is reduced.

To generate a two-dimensional illumination pattern in the case of a linear reader, for example for aiming and/or signalling the reading result, or in the case of a two-dimensional reader, a regular two-dimensional arrangement of elementary regions may be formed on the lens(es), each having a respective slope calculated according to the desired two-dimensional illumination pattern, in other words, also in a second direction orthogonal to said first direction, said first main face can exhibit a plurality of elementary regions, each of said elementary regions having a slope with respect to said optical axis that is individually calculated so that said elementary region deviates the light fraction coming from said at least one light source and incident thereon towards a specific elementary region of an illumination pattern of the reader.

The elementary regions of said at least one illumination lens can all have the same width in the first direction and/or the same width in the second direction, or they can have different widths in the first direction and/or different widths in the second direction for providing a further degree of freedom in the illumination pattern.

Advantageously, said at least one illumination lens is integrated in a common body with at least one lens of an optical receiving device of the optical code reader.

Typically, the reader comprises two of sources of non-collimated light and two illumination lenses.

In a second aspect thereof, the invention relates to an illumination lens for an optical code reader having one or more of the features described above.

In a third aspect thereof, the invention relates to a method for manufacturing a lens for use in an optical code reader comprising at least one light source, comprising the steps of:
  defining a plurality (n) of elementary regions of the lens along at least one direction,
  defining a plurality (m) of elementary regions in an illumination pattern,
  for each elementary region of the illumination pattern, calculating a slope of at least one elementary region of the lens such that said at least one elementary region of the lens deviates the light fraction coming from said at least one light source and incident thereon towards said elementary region of the illumination pattern, and
  manufacturing a lens having the calculated slope in each elementary region.

As seen above with reference to the lens of the invention, said at least one direction can be a single direction, in which case said elementary regions of the lens are strip-shaped, or said at least one direction may be two directions, said plurality of elementary regions of the lens comprising a regular two-dimensional array of elementary regions.

Preferably, the method further comprises the step of predetermining an irradiance profile of the illumination pattern; wherein the number of elementary regions of the lens involved in the step of calculating a slope for each elementary region of the illumination pattern is such that the total light deviated onto said elementary region of the illumination pattern corresponds to the predetermined irradiance profile.

The method may further comprise the step of imposing that the slopes of adjacent elementary regions differ by less than a predetermined threshold.

Alternatively, the method may further comprise the step of imposing that the slopes of adjacent elementary regions are in opposite directions.

Preferably, the method comprises the preliminary step of determining an irradiance profile of said at least one light source, and wherein the light fraction deviated by each elementary region of the lens is calculated as a function of said irradiance profile of said at least one light source.

Preferably, the step of manufacturing the lens comprises injection moulding the lens.

Figure 2:
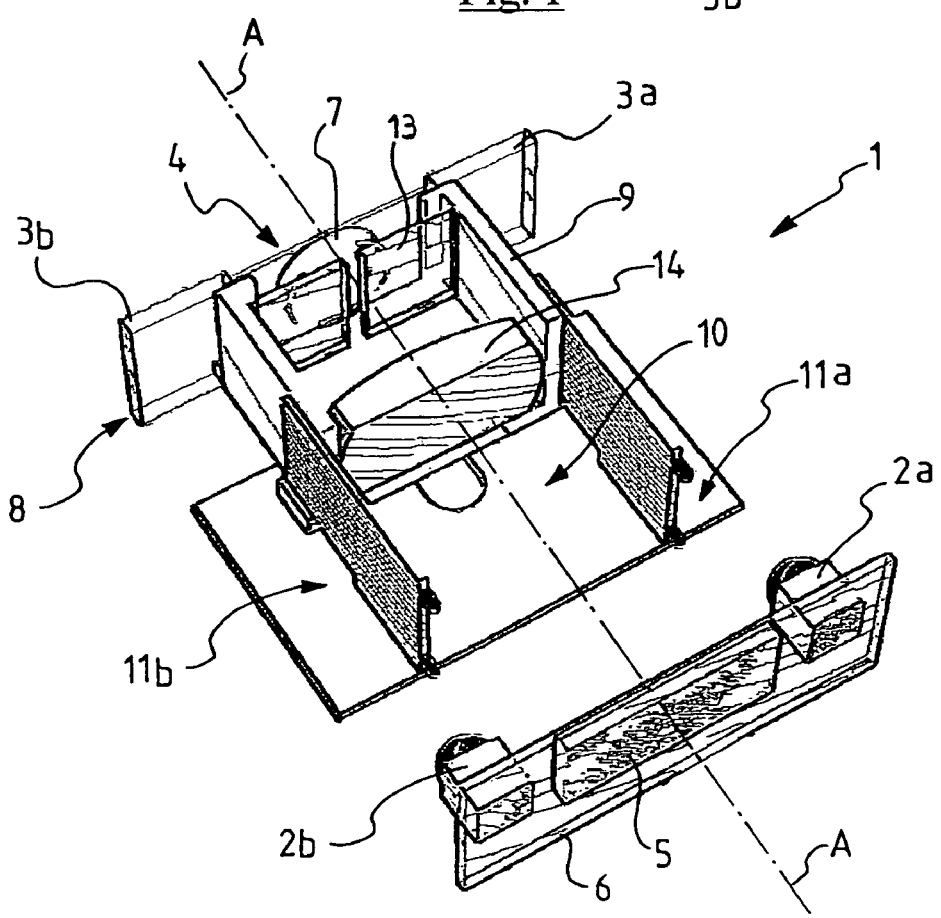
FIG. 2 shows a perspective, partly exploded view of part of the internal components of the reader of FIG. 1.
Figure 3:
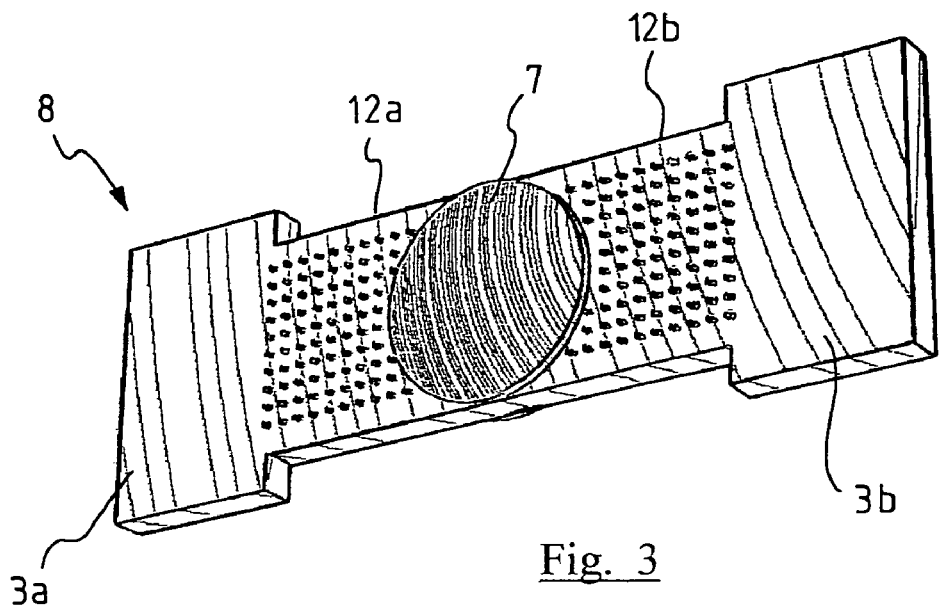
FIG. 3 shows a perspective view of part of the optics of the reader of FIG. 1, in a first embodiment thereof.

In FIGS. 1 and 2, an optical code reader 1 according to the invention is diagrammatically shown.

Reader 1 has an essentially parallelepiped shape and in a practical embodiment, its size may be within about 21.5 mm×17.5 mm×12.5 mm, that is, within a volume less than 5000 mm$^3$.

Reader 1 is an imager reader for linear optical codes and comprises two LED light sources 2a, 2b, an illumination optics comprising two lenses 3a, 3b for projecting the light emitted by the LED sources 2a, 2b into an illumination pattern and a receiving optics 4 for collecting the light diffused by a linear optical code illuminated by the illumination pattern onto a linear photodetector device or sensor 5.

The LED sources 2a, 2b are mounted at the sides of sensor 5, on a common printed circuit board (PCB) 6, which forms a rear face of reader 1. The common PCB 6 preferably further comprises the front-end electronics for pre-processing the signal output by the linear sensor 5, such as filters and analog amplifiers, as well as an analog-to-digital converter for converting the suitably pre-processed signal into a digital signal. Reader 1 can be further provided with a second PCB (not shown) comprising the electronic components for controlling reader 1, processing the digital signal generated by the common PCB 6, and decoding and/or interfacing with a host processor.

It shall be understood, however, that the common PCB 6 may be arranged parallel to the bottom wall of the reader, for example mounted thereon, there being provided oblique mirrors for deflecting the light in the emitting and receiving path.

In reader 1, the lenses of the illumination optics 3a, 3b and a lens 7 of the receiving optics are provided on a common body 8, which forms a front face of reader 1, but the three lenses 3a, 3b, 7 may also be separate elements.

The common body 8 is attached to a frame 9 sliding relative to the common PCB 6, as is better described in the patent application entitled "Optical code reader" filed on the same date as the present one by the same Applicant, incorporated herein by reference, but alternatively, the internal structure of reader 1 may be fixed.

Frame 9 physically and optically delimits three separate chambers: a central receiving chamber 10 comprising the receiving optics 4 and sensor 5, and two side illumination chambers 11a, 11b comprising the light sources 2a, 2b and the illumination optics 3a, 3b.

The common body 8 may be made by injection moulding in plastic material, and between the lens 7 of the receiving optics and the two lenses 3a, 3b of the illumination optics two diffusing, for example wrinkled, or opaque regions 12a, 12b may be formed, in order to hinder the transmission of light beams between the adjacent lenses. Alternatively, the common body 8 may be made by co-moulding two plastic materials, a transparent one for lenses 3a, 3b, 7 and an opaque one for said intermediate regions 12a, 12b thereinbetween. In the embodiment of the common body 8 shown in FIG. 4, the diffusing or opaque regions 12a, 12b are replaced by a transparent region 12c around lens 7 of the receiving optics 4, which is shaded by a wall of frame 9 shaped in a corresponding manner.

Figure 4:
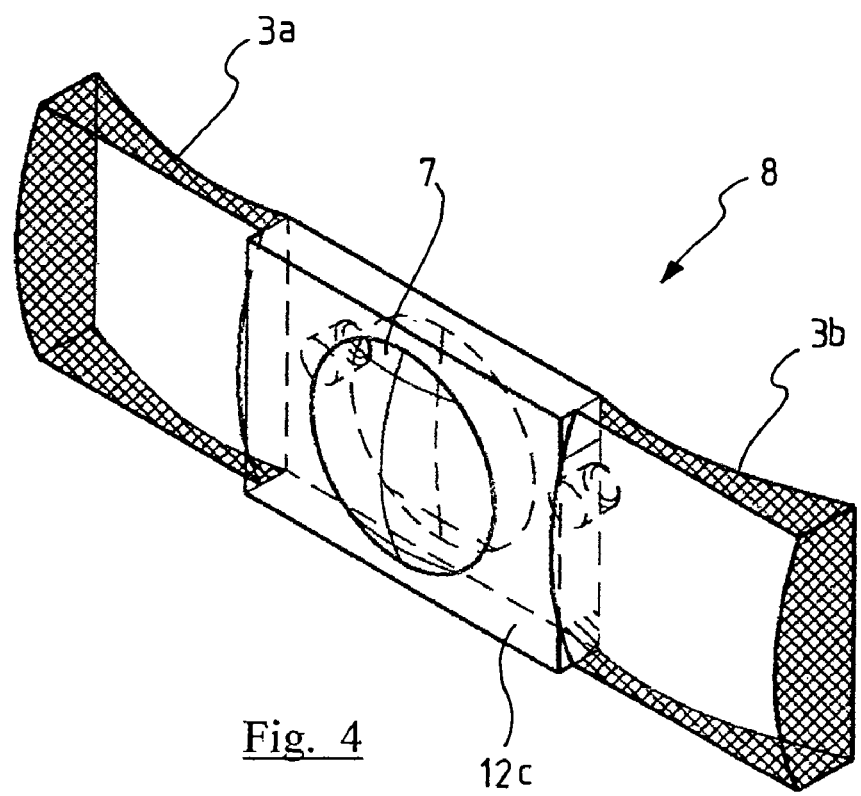
FIG. 4 shows a perspective view of part of the optics of the reader of FIG. 1, in a second embodiment thereof.

The edge walls of the common body 8 are preferably opacified (for example, darkened or treated to be diffusing), as diagrammatically indicated by the crossed hatching in FIG. 4, for preventing the inlet of side light from the surrounding environment.

Besides the above lens 7, the receiving optics 4 comprises a diaphragm 13 attached to frame 9 in proximity to the common body 8, and an optical group 14 comprising one or more lenses attached into frame 9.

To increase the luminosity, each light source 2a, 2b may comprise an array of LEDs. As an alternative to the LEDs, the light sources 2a, 2b may be Laser Diodes (LD) or Vertical Cavity Surface-Emitting Lasers (VCSEL), or a combination thereof.

There may also be a single illumination chamber, for example by providing for frame 9 to be on one side of reader 1. In this case, there will be a single LED, LD or VCSEL light source, or a single group of such sources, associated to a single illumination lens.

In the case of a linear reader 1 as shown, the illumination pattern should essentially be an illumination line and therefore, the two lenses 3a, 3b should carry out the function of diffusing the light emitted by sources 2a, 2b in one direction, in the case of a bar code essentially perpendicular to the code bars and spaces, and of concentrating the light emitted by sources 2a, 2b in a direction orthogonal to the direction in which the light is diffused, that is, parallel to the bars and spaces of the bar code, a direction in which the linear optical code is invariant.

According to the invention, this is achieved by a lens with locally defined profile, as better described hereinafter with reference to FIGS. 5 to 10 that show different embodiments, indicated with reference numerals 15, 19 and 24, of lens 3a, lens 3b being analogous.

In the following description, reference shall be made to the reader configuration shown in FIG. 2, wherein lenses 3a, 3b are arranged essentially perpendicular to the optical axis A-A of reader 1 (coinciding with the optical axis of the receiving optics 4) and thus essentially parallel to the plane intended for receiving the optical code. In such configuration, the direction in which the light should be diffused, indicated as first direction X, is parallel to one of the directions on lens 3a, 3b itself.

However, it is understood that what follows also applies to the case where the lenses are arranged at an angle with respect to the optical axis A-A (typically converging towards each other), simply taking into account that such angle evenly influences the optical light path through the entire lens.

The function of diffusing the light in the first direction X is achieved by forming on a first face, respectively 16, 20 and 25, in the first direction X, a plurality of elementary regions, respectively 17, 21 and 26 and 27, each with its own independent slope with respect to the optical axis A-A of reader 1, which as said above in the case of reader 1 is essentially orthogonal to the first face 16, 20, 25. The first face 16, 20 and 25 is preferably the one facing inwards of reader 1.

Each elementary region 17, 21 and 26 and 27 of lens 15, 19 and 24 thus deviates the light incident thereon according to a certain angle, independent of the angle according to which light is deviated by the other elementary regions 17, 21 and 26 and 27 of lens 15, 19 and 24.

Figure 5:
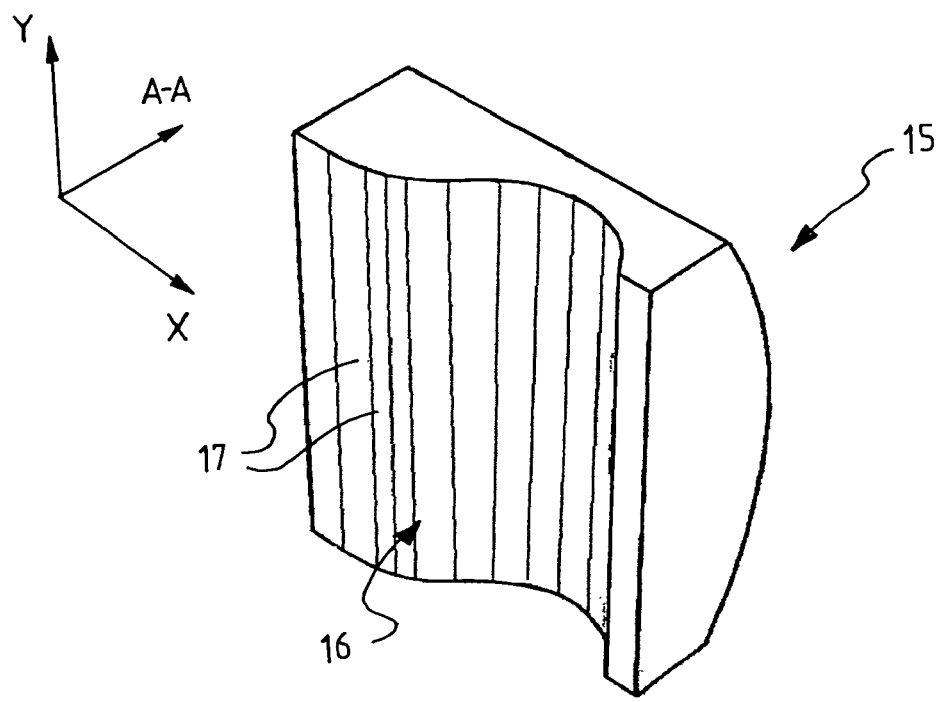
FIGS. 5 and 6 show a first embodiment of an illumination lens according to the invention.
Figure 6:
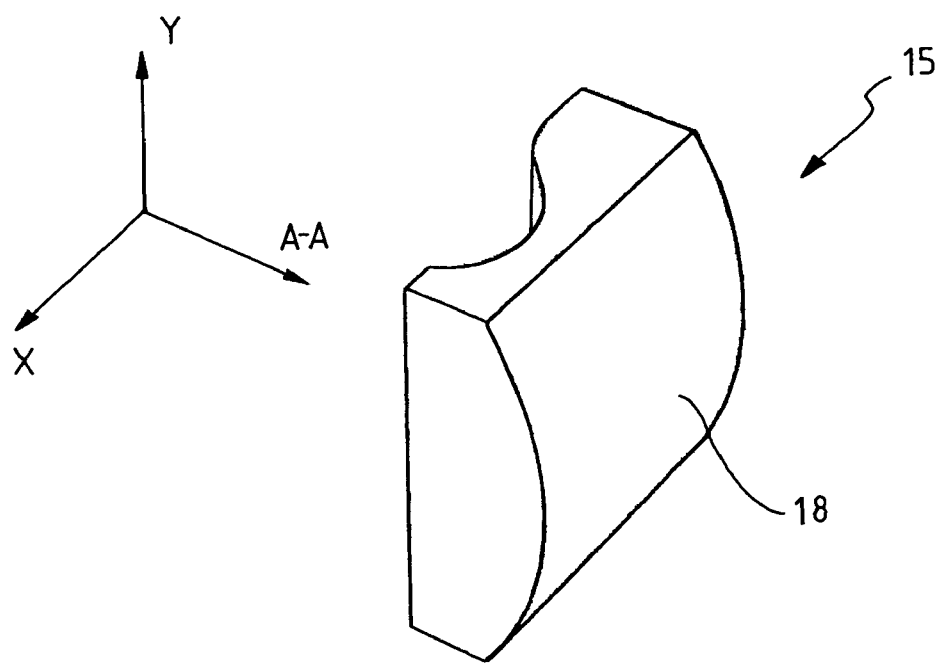

In lens 15 illustrated in FIGS. 5 and 6, the elementary regions 17 are curved regions, wherein the slope with respect to the optical axis A-A is to be understood as the angle between the optical axis A-A and the normal at the intermediate point of the elementary region 17.

The radius of curvature slowly changes between the elementary regions 17, so that lens 15 in practice, also due to the high density of elementary regions 17, has an essentially continuous profile, wherein the single elementary regions 17 cannot be distinguished by the naked eye.

In FIGS. 5 and 6, a small number of elementary regions 17 is shown for illustration purposes only. In a practical embodiment, the lens according to this embodiment shall have a much higher density of elementary regions, preferably at least 50 per millimeter.

Alternatively, the elementary regions 17 of lens 15 may be flat regions, close edges of adjacent elementary regions 17 being coincident.

The continuous profile lens 15 or the variant thereof with flat elementary regions 17, is easily made with low-cost techniques, such as injection moulding. Because of the profile continuity, lens 15 however has a quite variable thickness, comparably high in a portion thereof.

Figure 7:
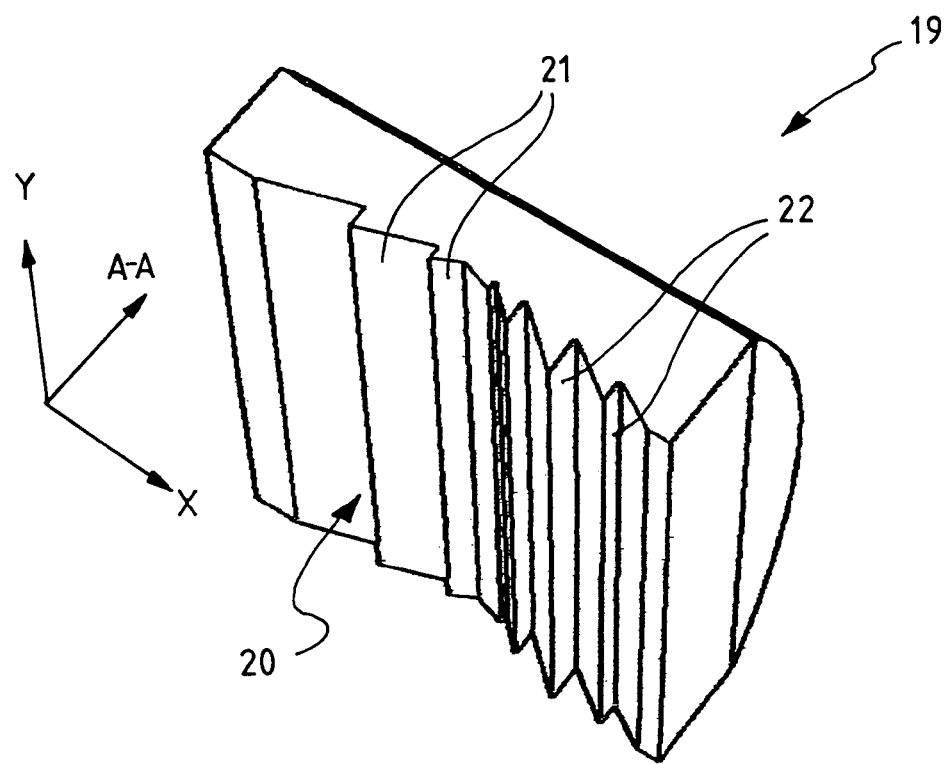
FIGS. 7 and 8 show a second embodiment of an illumination lens according to the invention.
Figure 8:
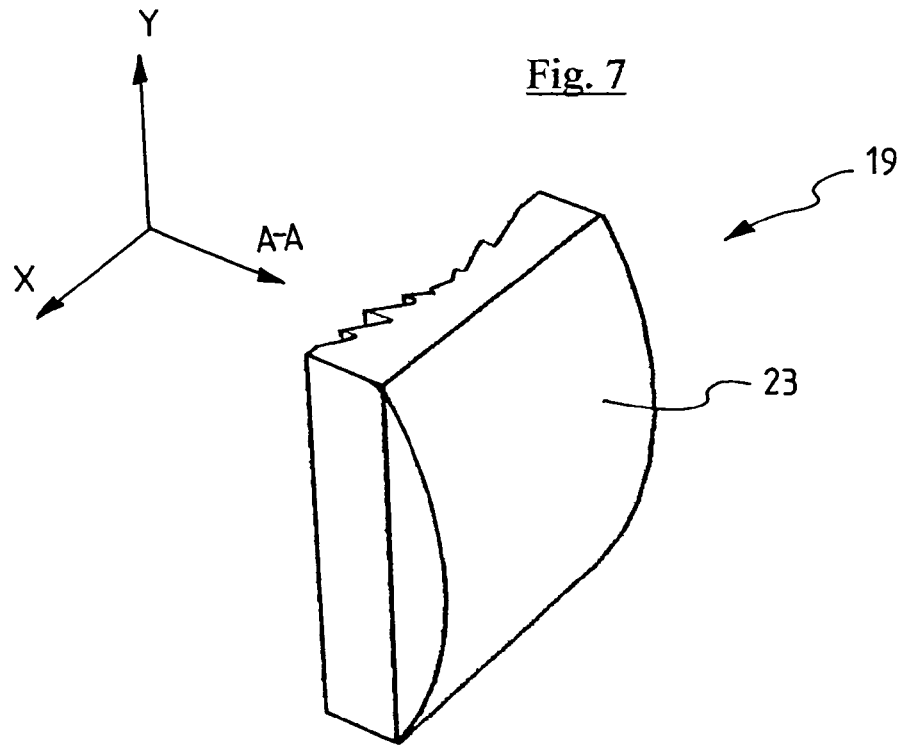

Lens 19 of FIGS. 7 and 8, instead, has a macroscopically essentially constant thickness for the entire width thereof in the first direction X. Such essentially constant thickness is provided by providing for close edges of adjacent elementary regions 21, which are flat, to be not coincident, rather connected by two connecting faces 22.

Lens 19 is well suitable for being made through sophisticated techniques for making a negative to use as a master for reproducing the lens, such as laser etching, reactive ion etching, electron beam scribing or other equivalent ones. The lens is then replicated by hot embossing of a plastic resin. In the case of injection moulding, however, the connecting faces 22 cannot be made on planes perfectly orthogonal to the plane of lens 19, rather they must form a small but finished mould draft angle. Thus, small but finished optically inactive or in any case inefficient areas are formed in lens 19.

Also in FIGS. 7 and 8 a small number of elementary regions 21 is shown for illustration purposes only, but in a practical embodiment, the lens according to this embodiment shall have a density of elementary regions preferably of at least 2 per millimeter.

Figure 9:
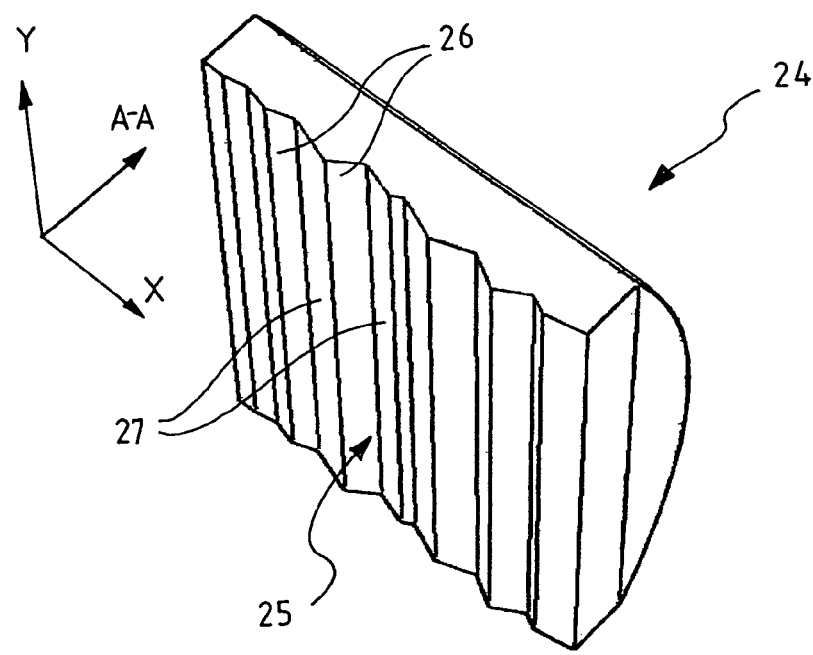
FIGS. 9 and 10 show a third embodiment of an illumination lens according to the invention.
Figure 10:
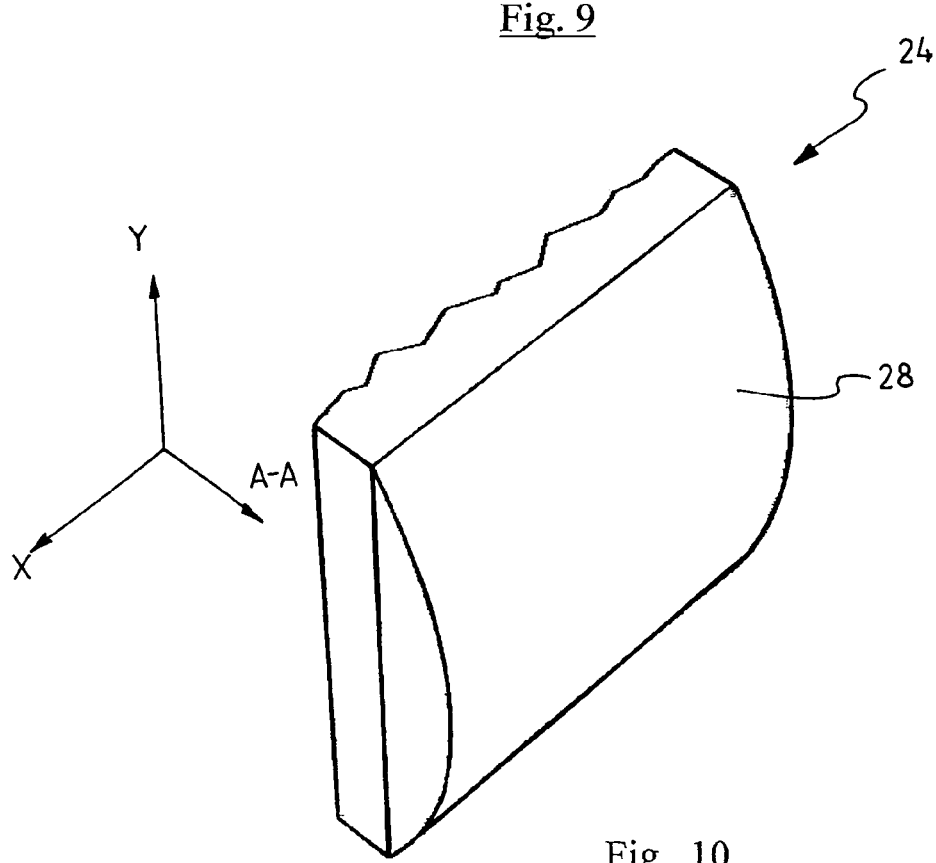

Lens 24 of FIGS. 9 and 10 comprises elementary regions 26 sloped in one direction alternating with elementary regions 27 sloped in the opposite direction, the specific slopes of the elementary regions 26 and 27 still being individually defined.

The close edges of adjacent elementary regions 26, 27 are coincident and macroscopically, lens 24 exhibits a essentially even thickness, without the need of connecting faces. However, its performance worsens more quickly as the reading distance from the focus plane changes, as compared to that of lenses 15 and 19.

Also in this embodiment, the density of elementary regions 26-27 is preferably of at least 2 per millimeter.

As said above, in the various embodiments of lens 15, 19 and 24, each elementary region 17, 21 and 26 and 27 deviates the light incident thereon according to an angle only imposed by the slope thereof with respect to axis A-A.

With reference again to FIG. 2, each lens 3a, 3b can be designed so as to project the light from the LED light source 2a, 2b into a desired illumination pattern, having a desired irradiance profile. The lenses of the invention, in fact, have no repetitiveness constraints as the lenticular or prismatic arrays or in holographic diffusers, nor any symmetry constraints as the cylindrical, toroidal or spherical lenses.

Figure 11:
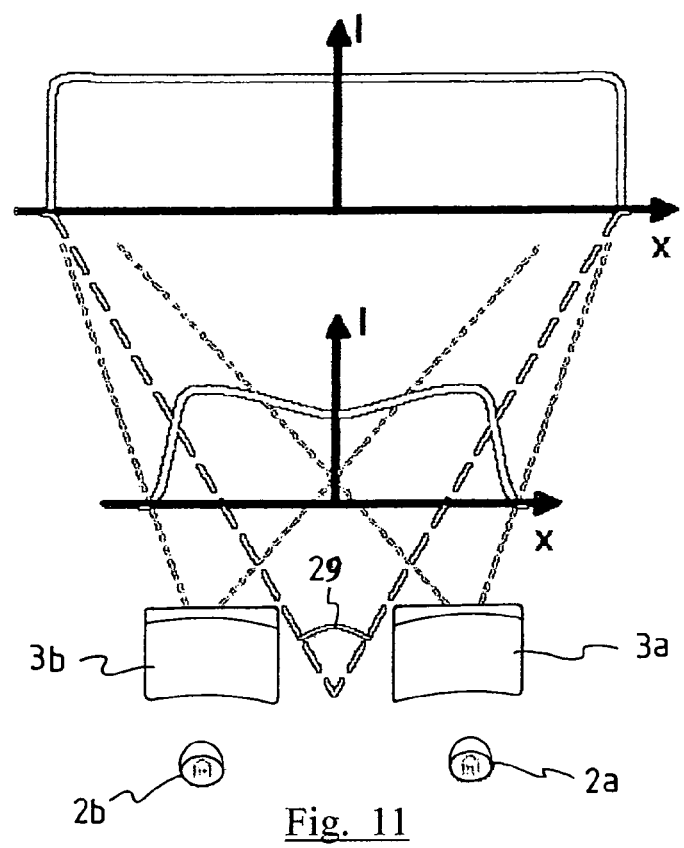
FIG. 11 shows an irradiance profile that can be generated at different reading distances with the lenses of the invention, in relation with the field of view of the receiving optics.
Figure 15:
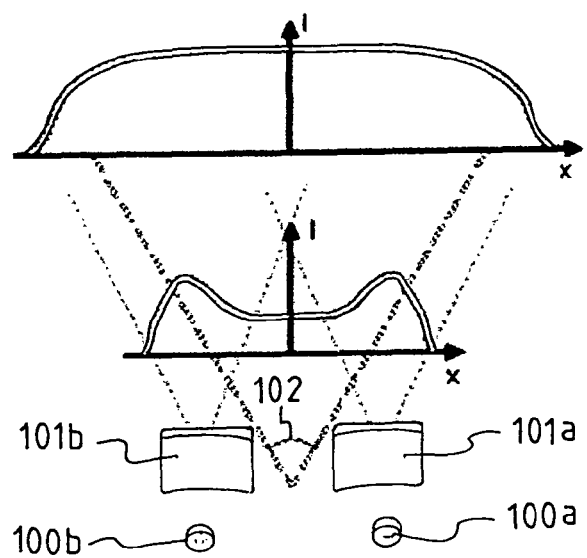
FIG. 15 shows the irradiance profile generated at different reading distances with the lenses of the prior art, in relation with the field of view of the receiving optics.

For example, it is possible to obtain an essentially rectangular irradiance profile, with well defined side edges, which makes the reading area better identifiable by the operator of reader 1, and which allows to maximize the optical efficiency since it is possible to illuminate all and only the field of view 29 of the receiving optics, as it is manifest from a comparison between FIG. 15 described above and referred to the prior art, and the analogous FIG. 11, referred to the use of lenses 3a and 3b of the invention.

Moreover, it is known that to obtain an illumination line whose uniformity is as invariant as possible as the distance between reader 1 and optical code changes, each of the two lenses 3a, 3b should suitably generate an irradiance profile described by a sigmoid function with odd symmetry. This essentially is a modified triangular function wherein the hypotenuse exhibits an inflexion point, a function difficult to obtain with the lenses of the prior art. If, on the other hand, each of the two lenses 3a, 3b generated an irradiance profile shaped as a right-angled triangle, as the distance between reader 1 and the optical code decreases, the triangular profiles would depart from each other and the centre of the illumination pattern would be less illuminated. Through the locally defined profile of the lenses of the invention, it is possible to obtain any desired irradiance profile, including such odd symmetry sigmoid function profiles.

It will be understood, moreover, that with the locally defined profile of the invention it is possible to compensate for any illumination non-uniformity caused by the emission characteristics of the light sources used, such as the typical central dark area corresponding to the microchip bonding wire in the case of LED sources. Since the lenses of the invention are by construction of the non-imaging type, such central dark area is not projected onto the illumination pattern as it happens with the typical optics of the prior art which, instead, are of the imaging type (cylindrical, toroidal and spherical lenses).

Figure 12:
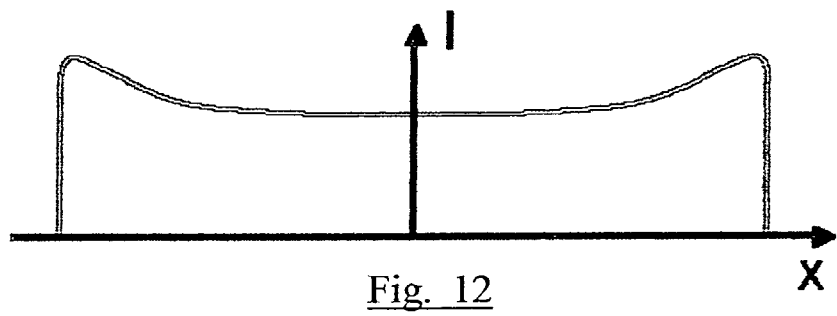
FIG. 12 shows another irradiance profile that can be generated with the lenses of the invention.

With the locally defined profile of the invention, moreover, it is possible to compensate for any non-uniformity of response among the sensitive regions of sensor 5, caused for example by the different angle at which they are illuminated by the light diffused by the optical code, by simply providing for the regions wherein the optical signal would be weaker to be more illuminated, in particular by illuminating more at the edges of the illumination line, as shown in FIG. 12.

It is also possible to especially highlight the edges of the illumination line or to create two spots or segments next to the ends thereof, thus providing a pointer for the operator of reader 1.

Moreover, it is possible to allocate portions of face 16, 20, 25 of each lens to form a light pattern for signalling the result of the optical code reading, in association with different LED sources (not shown), typically of a colour differing from that of the LED illumination sources 2a, 2b.

It is also possible to allocate one of the two illumination lenses 3a, 3b to generate the illumination pattern and the other one to form the aiming light pattern and/or the light pattern for signalling the reading result.

Figure 13:
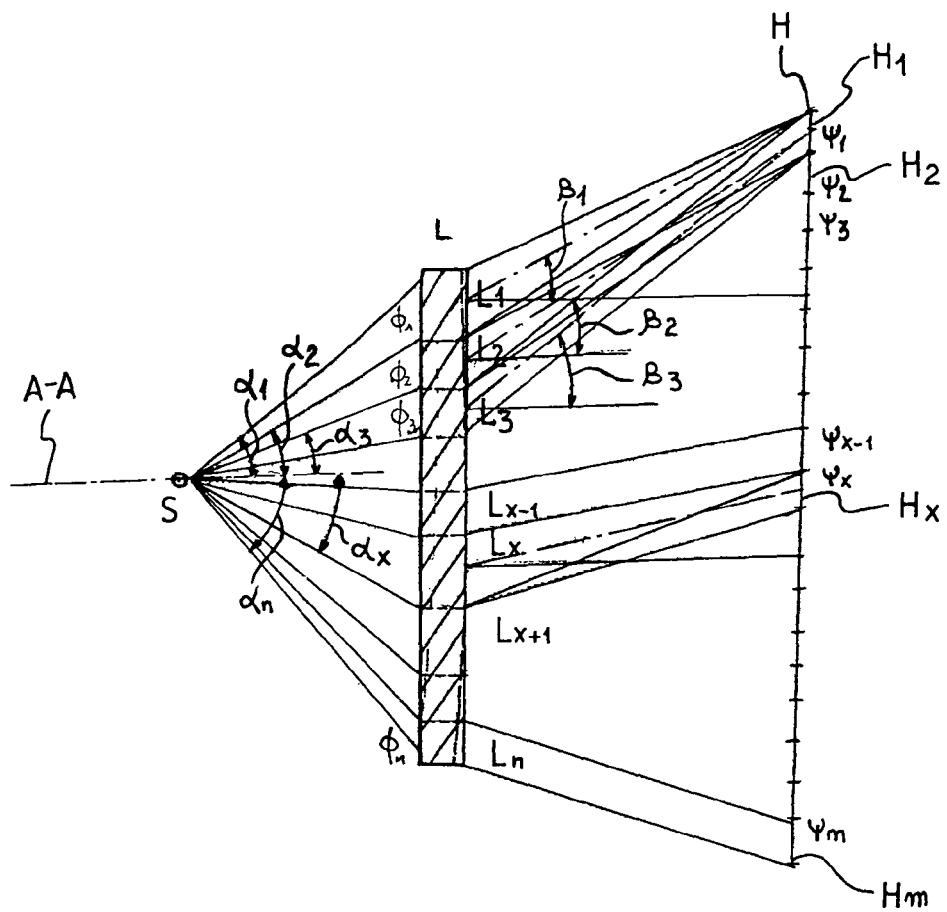
FIG. 13 shows a diagrammatic view of some entities interested in a procedure for calculating local slopes of the lens according to the invention.

With reference to FIG. 13, a procedure for calculating the slopes of the elementary regions 17, 21, 26-27 of lenses 15, 19, 24 shall now be described.

In the first place, n elementary regions $L1, L2, L3, \ldots Ln$ of the lens are defined along the first direction X. To each portion of the lens, a portion $\Phi 1, \Phi 2, \Phi 3, \ldots \Phi n$ of the luminous flux emitted by the light source S is associated. The portions of luminous flux $\Phi 1, \Phi 2, \Phi 3, \ldots \Phi n$ may be considered as being all equal to each other and equal to the fraction n of the total luminous flux emitted by the light source S, but preferably they actually take the irradiance profile along the first direction $\Phi(X)$ of the light source S into account, which for convenience may be expressed as $\Phi(\alpha)$ where $\alpha$ is the emission angle, measured starting from the optical axis A-A.

The illumination pattern H is in turn divided into m elementary regions, preferably but not necessarily, with m<n. The desired illumination profile is expressed as partial luminous fluxes $\Psi 1, \Psi 2, \Psi 3, \ldots \Psi m$ that should be incident in each of the m elementary regions. It is assumed that the partial luminous fluxes $\Psi 1, \Psi 2, \Psi 3, \ldots \Psi m$ are each greater than or equal to, the greatest of the partial luminous fluxes $\Phi 1, \Phi 2, \Phi 3, \ldots \Phi n$ coming from source S.

Relation $\beta(\Psi)$ is thus sought, where $\beta$ is the angle refracted by the nth portion of the lens.

The slope of the first elementary region L1 of the lens is first calculated according to the law of refraction, imposing that the refraction angle $\beta 1$ deviates the portion of luminous flux $\Phi 1$ into the first elementary region H1 of the illumination pattern, where the luminous flux $\Psi 1$ is required. If $\Phi 1$ is equal or sufficiently close to $\Psi 1$, the procedure continues with the second elementary region H2 of the illumination pattern.

If instead 1 is less than $\Psi 1$, also the luminous flux $\Phi 2$ associated to the next (the second) elementary region L2 of the lens is deviated onto the first elementary region H1 of the illumination pattern, calculating, again according to the law of refraction, the slope of the second elementary region L2 of the lens. The procedure optionally continues with the next elementary regions Lx of the lens until the required luminous flux is reached or sufficiently approximated in the first elementary region H1 of the illumination pattern, for example $\Phi 1+\Phi 2=\Psi 1$.

Once the required luminous flux $\Psi 1$ has been reached in the first elementary region H1, the procedure continues with the second elementary region H2, and the luminous flux $\Phi 3, \ldots$ of the next elementary region(s) $L3, \ldots$ of the lens is deviated thereon until the value of luminous flux $\Psi 2$ required for the second elementary region of the illumination pattern is reached.

The procedure is repeated considering all the elementary regions $H1, H2, H3, \ldots Hm$ of the illumination pattern.

In general, each portion of luminous flux $\Psi 1, \Psi 2, \Psi 3, \ldots \Psi m$ required in the illumination pattern will correspond to the sum of one or more contributions $\Phi x$ coming from the light source S, each deviated by the suitable angle $\beta x$, calculated on the basis of the law of refraction. A relation $\alpha(\beta)$ between the emission angle $\alpha$ of the light source S and the refraction angle $\beta$ of the lens is thus created discrete point by discrete point, which allows "mapping" the initial flux distribution $\Phi(\alpha)$ onto the illumination pattern H.

In case the elementary regions $L1, L2, L3, \ldots Ln$ of the lens end before all elementary regions $H1, H2, H3, \ldots Hm$ of the illumination pattern H have been considered, or vice versa, in case elementary regions $L1, L2, L3, \ldots Ln$ of the lens are left after considering all the elementary regions $H1, H2, H3, \ldots Hm$ of the illumination pattern, the procedure may be repeated changing number m or number n, or changing the size of the single elementary regions $L1, L2, L3, \ldots Ln$ of the lens or of the elementary regions $H1, H2, H3, \ldots Hm$ of the illumination pattern H.

It is worth noting that by iteratively modulating the size of each elementary region H1, H2, H3, . . . Hm of the illumination pattern H it is also possible to make the required luminous flux $\Psi m$ therein exactly coincide with a sum of luminous fluxes deviated by an entire number of elementary regions L1, L2, L3, . . . Ln of the lens.

Moreover, it is possible to use this method in combination with an optimisation method, which calculates the optimum profile $\alpha(\beta)$ at different reading distances, that is, the one that on the average less violates the illumination conditions imposed at the different distances; to this end, any known optimisation method is suitable, such as least squares, Lagrange multipliers, etc.

Since in the above described calculation procedure the elementary regions of both the lens and the illumination pattern are considered in a sequence, the change of slope between adjacent elementary regions L1, L2, L3, . . . Ln of the lens usually is quite limited, at least if a uniform irradiance profile $\Psi$ of the illumination pattern H is desired. The above described procedure is therefore suitable for obtaining the continuous profile lens 15 of FIGS. 5 and 6 or the collapsed profile lens 19 of FIGS. 7 and 8.

In any case, it is possible to impose, as a further constraint, for the change of slope of adjacent elementary regions L1, L2, L3, . . . Ln of the lens to occur in a more or less slow manner, so as to impose the speed of variation of the lens profile and thus facilitate the manufacture thereof.

In the case of the interlaced profile lens 24 illustrated in FIGS. 9 and 10, the luminous flux $\Phi x$ of non-contiguous elementary regions Lx of the lens shall be made to contribute to each elementary region Hx of the illumination pattern, imposing to each elementary region Lx of the lens to have a slope in a direction opposite to the adjacent elementary regions Lx−1 and Lx+1.

As mentioned above, if it is desired to further increase the available degrees of freedom in the design of the lenses according to the invention, it is possible to provide for the elementary regions of lens 17, 21, 26-27 to have any widths, differing from one another. In this way, each of them will receive and deviate a luminous flux which is a function not only of the irradiance profile of the light source 2a, 2b, but also of its width.

In each of lenses 15, 19 and 24, the function of concentrating the light in the second direction Y (with reference to the figures), parallel to the bars and spaces of a bar code, is achieved in a particularly easy way by providing for the second main face, respectively 18, 23 and 28, to be cylindrical. The second cylindrical face 18, 23 and 28 is preferably that facing outwards of reader 1.

Alternatively, it is possible to make also the second face 18, 23 and 28 with a plurality of elementary regions, each having a slope with respect to the optical axis A-A of reader 1 that is individually calculated so that the second face 18, 23 and 28 concentrates the light in the second direction Y. With reference to the calculation procedure described above, this can be obtained by imposing that all the elementary regions of the lens in direction Y, namely in a section of the lens parallel to direction Y, deviate the light towards the same elementary region of the reading area in direction Y.

In this way it is possible to obtain a strip-like illumination pattern wherein also the longitudinal edges of the strip are more defined and more marked, as compared to that generated by a conventional cylindrical lens, since the spherical aberration contribution that is instead present with a conventional lens is reduced.

Figure 14:
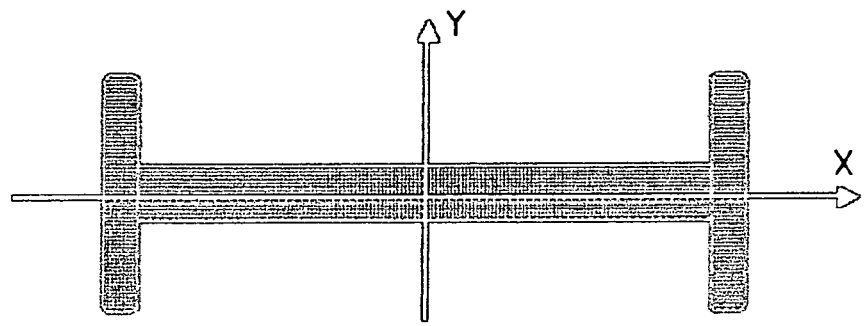
FIG. 14 shows an illumination pattern that can be generated with the lenses of the invention.

Such a configuration of the second face 18, 23 and 28 of lens the 15, 19, 24 of the invention can further be used for forming two-dimensionally extended portions of the illumination pattern, for example for forming an aiming pattern like the one shown in FIG. 14, which allows especially highlighting the edges of the illumination line, thus providing a pointer for the operator of reader 1.

In the case of a two-dimensional reader, sensor 5 is of the two-dimensional type with suitable receiving optics 4, and typically the illumination pattern should be essentially rectangular, square, circular or elliptical.

Also in that case, it is possible to use both faces of lens 15, 19, 24 for creating the desired illumination pattern.

Alternatively, both in the case of two-dimensional illumination pattern for a one-dimensional reader and in the case of a two-dimensional reader, the elementary regions of the first face of lens 3a, 3b according to the invention can be defined along two directions X and Y orthogonal to each other. In other words, instead of having strip-shaped elementary regions of the first face 16, 20, 25 (shaped as vertical strips in the orientation of FIGS. 5-10), it may be provided for the lens to have a two-dimensional array of elementary regions shaped as small squares or rectangles. The above calculation procedure is applicable mutatis mutandis.

In this case, the second face of the lens may be flat, shaped as a cylindrical lens or also with a locally defined profile according to one or two directions.

Also in the case of a regular two-dimensional array of elementary regions, it is possible to configure lenses 3a, 3b in the above described three embodiments with continuous profile, collapsed profile and interlaced profile.

Moreover, also in the case of two-dimensional array of elementary regions, it is possible to use one or more regions of one or both lenses 3a, 3b, or one of the two lenses 3a, 3b, for generating an aiming light pattern and/or a light pattern for signalling the reading results.

It will be understood that the illumination optics associated to the light sources 2a, 2b may also comprise lenses integrated in the LED sources 2a, 2b themselves, as well as diaphragms for selecting a portion of the light beam emitted by the LED sources 2a, 2b.

If a diaphragm is present, all the above remarks on the light source and the irradiance profile thereof are to be understood as referred to the diaphragmed source, which becomes in every respect the "actual" source for the illumination lens.

Finally, it will be understood that the reader of the invention, in any of the above described embodiments, may be housed in both a portable and a fixed enclosure, for any optical code reading application.

The invention claimed is:
1. An optical code reader of the imager type, comprising:
at least one light source; and
at least one non-imaging illumination lens downstream of said at least one light source for projecting a predetermined illumination pattern, said at least one non-imaging illumination lens comprising a first main face, wherein in a first direction, said first main face has a plurality of elementary regions, each of said elementary regions of said at least one non-imaging illumination lens having a slope with respect to an optical axis of the reader that is individually calculated so that said elementary region deviates the light fraction coming from said at least one light source and incident thereon towards a specific elementary region of the illumination pattern.
2. The reader according to claim 1, wherein adjacent elementary regions of said at least one non-imaging illumination lens have slopes that are individually calculated for illuminating a same elementary region of the illumination pattern or adjacent elementary regions of the illumination pattern.

3. The reader according to claim 2, wherein the elementary regions of said at least one non-imaging illumination lens are curved regions, the radius of curvature slowly changing between adjacent elementary regions of said at least one non-imaging illumination lens.

4. The reader according to claim 3, wherein a density of the elementary regions is more than 50 elementary regions per millimeter.

5. The reader according to claim 2, wherein the elementary regions of said at least one non-imaging illumination lens are flat regions, close edges of adjacent elementary regions being coincident.

6. The reader according to claim 2, wherein the elementary regions of said at least one non-imaging illumination lens are flat regions, close edges of adjacent elementary regions of said at least one non-imaging illumination lens being not coincident, with connecting faces arranged thereinbetween.

7. The reader according to claim 6, wherein a density of the elementary regions is more than 2 elementary regions per millimeter.

8. The reader according to claim 1, wherein the specific elementary regions of the illumination pattern are selected so that adjacent elementary regions of said at least one non-imaging illumination lens have slopes in opposite directions.

9. The reader according to claim 8, wherein a density of the elementary regions is more than 2 elementary regions per millimeter.

10. The reader according to claim 1, wherein said slopes are calculated so that the elementary regions of the illumination pattern are equally illuminated.

11. The reader according to claim 1, said slopes are calculated so that end elementary regions of the illumination pattern are more illuminated than intermediate elementary regions of the illumination pattern.

12. The reader according to claim 1, wherein said slopes are calculated so as to further generate an aiming light pattern.

13. The reader according to claim 1, wherein said slopes are calculated so as to further generate a light pattern for signalling the result of the reading.

14. The reader according to claim 1, wherein said slopes are calculated so as to minimize the influence of the distance between the reader and the illumination pattern on the irradiance profile of said illumination pattern.

15. The reader according to claim 1, further comprising a photodetector device arranged for receiving said light diffused by a support illuminated by said illumination pattern, wherein said slopes are calculated so that said illumination pattern has an irradiance profile such that said light received by said photodetector device has a uniform distribution when said support has uniform diffusing properties.

16. The reader according to claim 1, wherein a second main face of said at least one non-imaging illumination lens, opposite to the first main face, is a cylindrical surface.

17. The reader according to claim 1, wherein in a second direction orthogonal to said first direction, a second main face of said at least one non-imaging illumination lens, opposite to the first main face, exhibits a plurality of second elementary regions, each of said second elementary regions having a slope with respect to said optical axis that is individually calculated so that all the second elementary regions deviate the light fraction coming from said at least one light source and incident thereon towards a same elementary region of an illumination pattern.

18. The reader according to claim 1, wherein in a second direction orthogonal to said first direction, said first main face exhibits a plurality of elementary regions, each of said elementary regions having a slope with respect to said optical axis that is individually calculated so that said elementary region deviates the light fraction coming from said at least one light source and incident thereon towards a specific elementary region of an illumination pattern of the reader.

19. The reader according to claim 1, wherein the elementary regions of said at least one non-imaging illumination lens have all the same width in the first direction and/or the same width in the second direction.

20. The reader according to claim 1, wherein the elementary regions of said at least one non-imaging illumination lens have different widths in the first direction and/or different widths in the second direction.

21. The reader claim 1, wherein said at least one non-imaging illumination lens is integrated in a common body with at least one lens of an optical receiving device of the reader.

22. The reader according to claim 1, further comprising two sources of non-collimated light and two non-imaging illumination lenses.

23. A non-imaging illumination lens for an optical code reader for projecting a predetermined illumination pattern, said non-imaging illumination lens comprising a first main face, wherein in a first direction, said first main face has a plurality of elementary regions, each of said elementary regions of said non-imaging illumination lens having a slope with respect to an optical axis of the reader that is individually calculated so that said elementary region deviates the light fraction coming from said at least one light source and incident thereon towards a specific elementary region of the illumination pattern.

24. A method for manufacturing a non-imaging illumination lens for use in an optical code reader comprising at least one light source, comprising the steps of:
   defining a plurality of elementary regions of the non-imaging illumination lens along at least one direction,
   defining a plurality of elementary regions of an illumination pattern,
   for each elementary region of the illumination pattern, calculating a slope of at least one elementary region of the non-imaging illumination lens such that said at least one elementary region of the non-imaging illumination lens deviates the light fraction coming from said at least one light source and incident thereon towards said elementary region of the illumination pattern, and
   manufacturing a non-imaging illumination lens having the calculated slope in each elementary region.

25. The method according to claim 24, wherein said at least one direction is a single direction and said elementary regions of the non-imaging illumination lens are strip-shaped.

26. The method according to claim 24, wherein said at least one direction is two directions and said plurality of elementary regions of the non-imaging illumination lens comprises a two-dimensional array of elementary regions.

27. The method according to claim 24, further comprising the step of predetermining an irradiance profile of the illumination pattern; wherein the number of elementary regions of the non-imaging illumination lens involved in the step of calculating a slope for each elementary region of the illumination pattern is such that the total light deviated on said elementary region of the illumination pattern corresponds to the predetermined irradiance profile.

28. The method according to claim 24, further comprising the step of imposing that the slopes of adjacent elementary regions of the non-imaging illumination lens differ by less than a predetermined threshold.

29. The method according to claim 24, further comprising the step of imposing that the slopes of adjacent elementary regions are in opposite directions.

30. The method according to claim 24, further comprising the preliminary step of determining an irradiance profile of said at least one light source, and wherein the light fraction deviated by each elementary region of the non-imaging illumination lens is calculated as a function of said irradiance profile of said at least one light source.

31. The method according to claim 24, wherein said step of manufacturing the non-imaging illumination lens comprises injection moulding the lens.

* * * * *